(12) United States Patent  
Evans et al.

(10) Patent No.: US 8,194,197 B2
(45) Date of Patent: Jun. 5, 2012

(54) INTEGRATED DISPLAY AND PHOTOVOLTAIC ELEMENT

(75) Inventors: Allan Evans, Oxford (GB); Stephen Day, Norton (GB); Sunay Shah, Oxford (GB); Patrick Zebedee, Oxford (GB); Lesley Parry-Jones, Oxford (GB); Gareth Nicholas, Reading (GB)

(73) Assignee: Sharp Kabushiki Kaisha, Osaka (JP)

( * ) Notice: Subject to any disclaimer, the term of this patent is extended or adjusted under 35 U.S.C. 154(b) by 4 days.

(21) Appl. No.: 12/759,312

(22) Filed: Apr. 13, 2010

(65) Prior Publication Data

US 2011/0249219 A1    Oct. 13, 2011

(51) Int. Cl.
*G02F 1/135* (2006.01)
*G02F 1/136* (2006.01)
*G02F 1/1335* (2006.01)

(52) U.S. Cl. .............................. 349/25; 349/43; 349/113
(58) Field of Classification Search .................. 349/116, 349/25–28
See application file for complete search history.

(56) References Cited

U.S. PATENT DOCUMENTS

| | | | |
|---|---|---|---|
| 5,188,760 A | 2/1993 | Hikmet et al. | |
| 5,523,776 A | 6/1996 | Hougham et al. | |
| 5,539,556 A | 7/1996 | Demus et al. | |
| 6,323,923 B1 | 11/2001 | Hoshino et al. | |
| 6,452,088 B1 | 9/2002 | Schmidt et al. | |
| 6,518,944 B1 | 2/2003 | Doane et al. | |
| 7,102,706 B2 | 9/2006 | Kim et al. | |
| 7,206,044 B2 | 4/2007 | Li et al. | |
| 7,242,449 B1 * | 7/2007 | Yamazaki et al. | 349/116 |
| 2005/0117096 A1 | 6/2005 | Voloschenko et al. | |
| 2007/0102035 A1 | 5/2007 | Yang et al. | |
| 2007/0247574 A1* | 10/2007 | Kudo | 349/114 |
| 2008/0006828 A1* | 1/2008 | Zhang et al. | 257/72 |
| 2009/0103161 A1 | 4/2009 | Kothari et al. | |
| 2009/0103165 A1 | 4/2009 | Kothari et al. | |
| 2009/0219273 A1 | 9/2009 | Nathan et al. | |
| 2010/0134735 A1* | 6/2010 | Nakamura et al. | 349/116 |

* cited by examiner

*Primary Examiner* — Wen-Ying P Chen
(74) *Attorney, Agent, or Firm* — Renner, Otto, Boisselle & Sklar, LLP

(57) ABSTRACT

A display device includes a first layer having an optically active display portion, a second layer including a photovoltaic element, and a third layer including electronics operatively coupled to the first layer, wherein the electronics are configured to drive the optically active display portion. Further, the second layer is arranged between the first and third layers.

21 Claims, 16 Drawing Sheets

**Fig. 1a
(Conventional)**
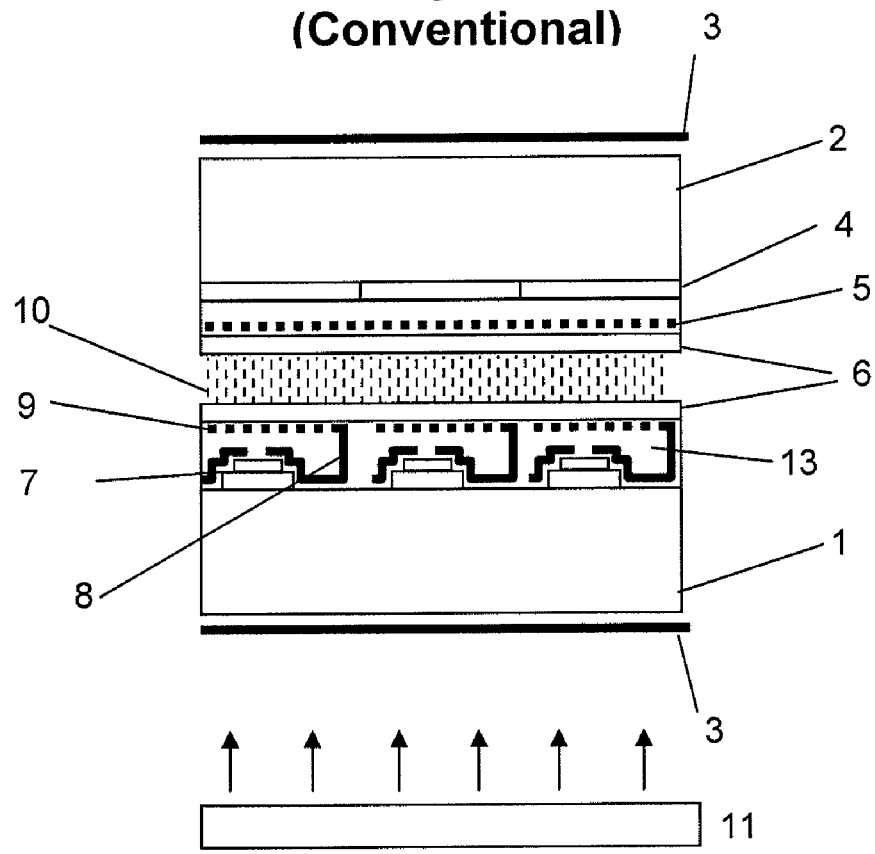
**Fig. 1b
(Conventional)**
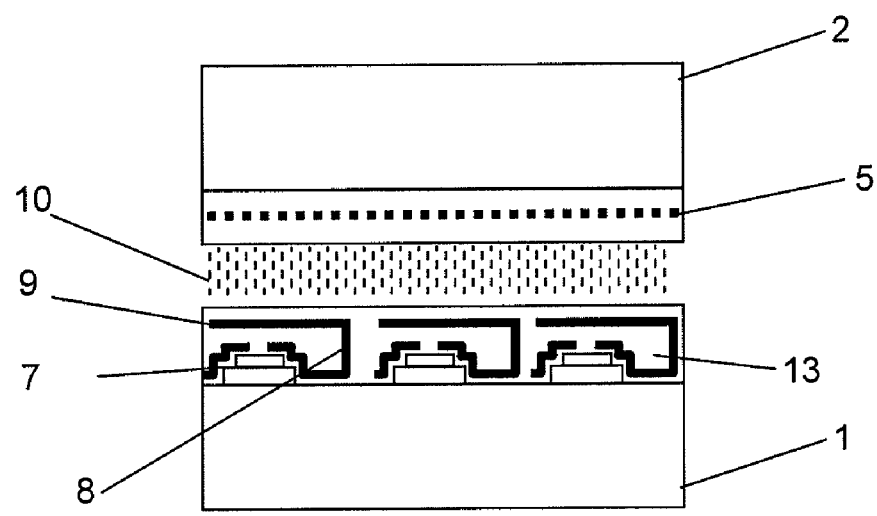

Fig. 2a
(Conventional)
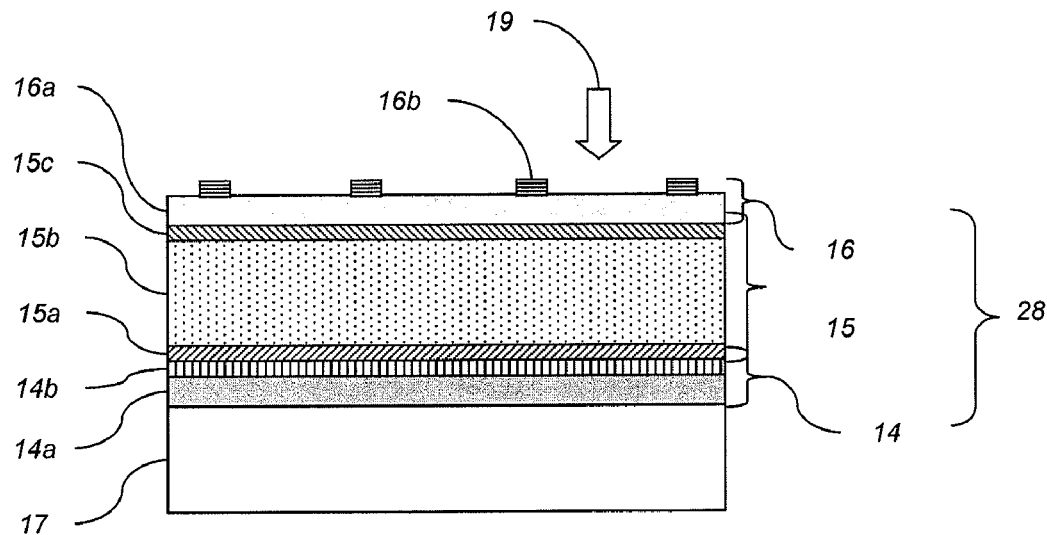
*a) Substrate configuration*
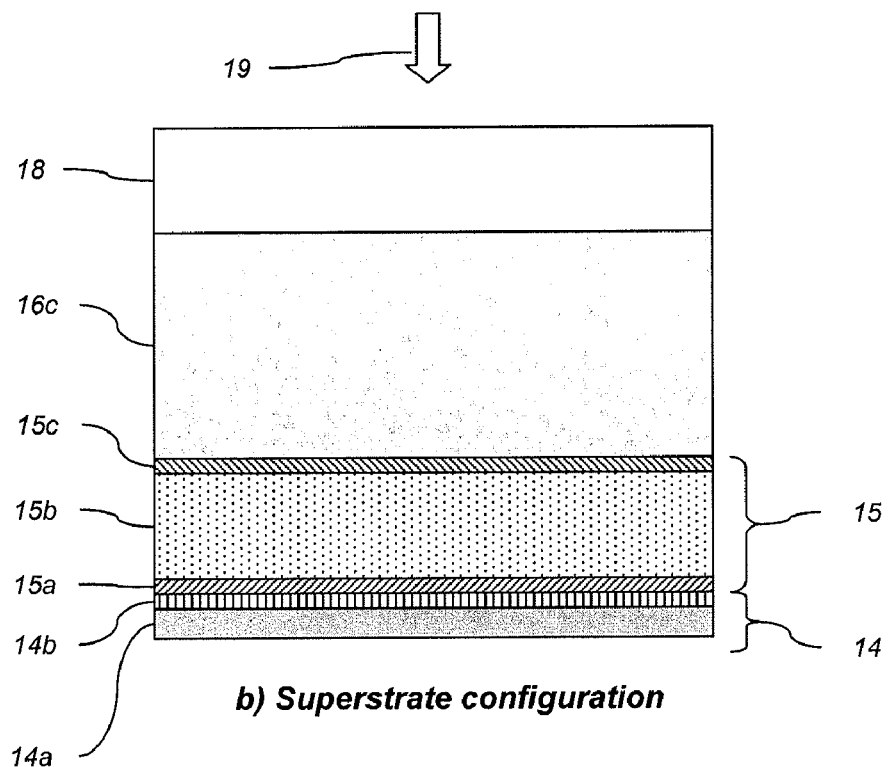
*b) Superstrate configuration*
Fig. 2b
(Conventional)

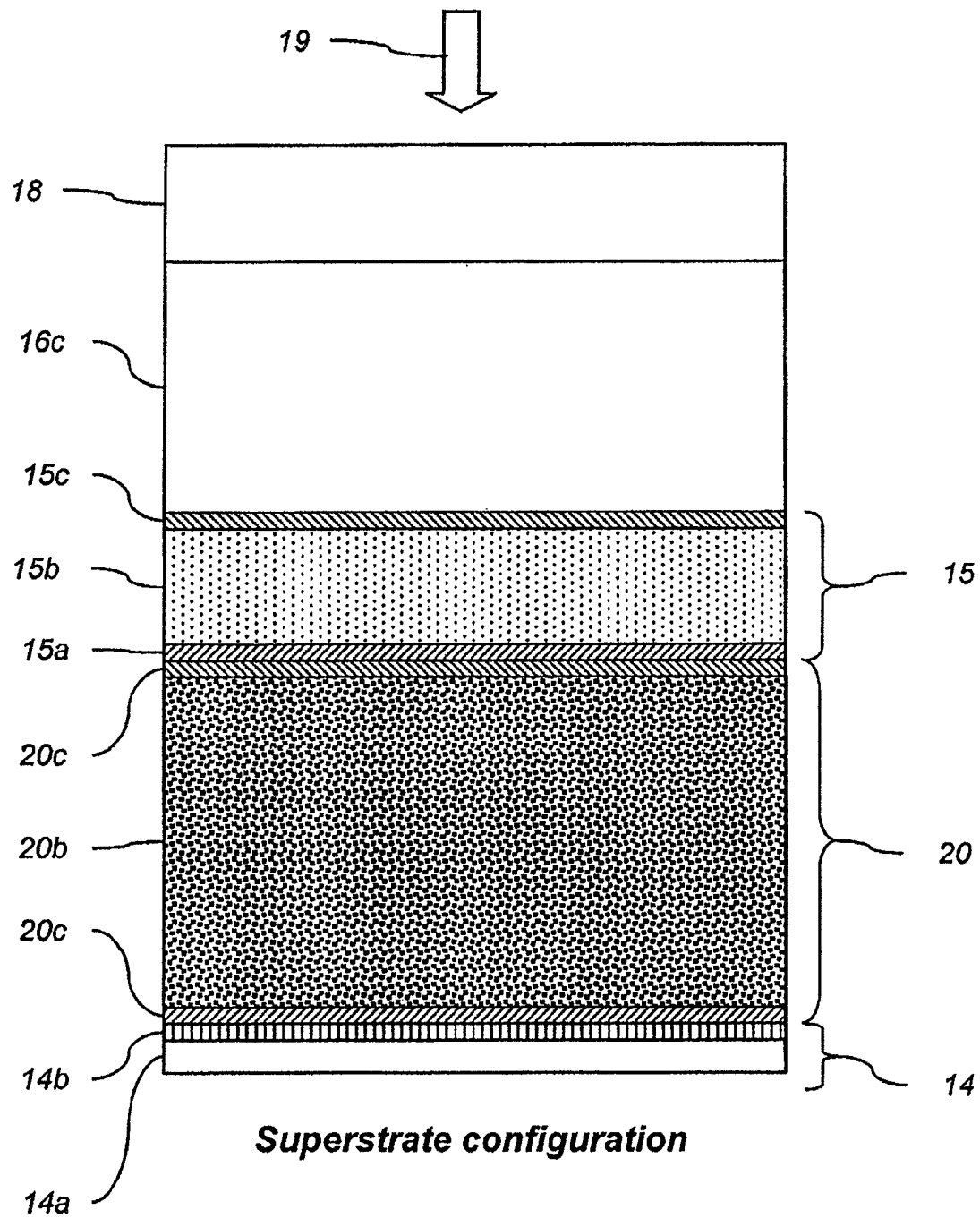
Fig. 3
(Conventional)

a)

b)

INTEGRATED DISPLAY AND PHOTOVOLTAIC ELEMENT

TECHNICAL FIELD

The present invention relates generally to display devices and, more particularly, to a device and method that combines a display element and a photovoltaic element so that they occupy the same area and both operate as efficiently as possible.

BACKGROUND ART

Displays such as liquid crystal displays (LCDs) and organic LED displays (OLEDs) occupy a significant part of the surface of many electronic devices such as mobile telephones, televisions and monitors. Photovoltaic power generation devices also are used in some of these devices and must occupy large areas to generate significant amounts of power.
Liquid Crystal Displays FIGS. 1a and 1b show schematic diagrams of typical active-matrix liquid crystal displays. FIG. 1a is a colour transmissive display, and FIG. 1b is a monochrome reflective display.

In each case, the display is constructed on two substrates 1 and 2. These are typically glass but may also be polymer. The liquid crystal layer 10 is a nematic liquid crystal in the case of the transmissive display, and a polymer/liquid crystal composite in the case of the reflective display. In both cases, a common electrode 5 on the upper substrate, made of a transparent conductor such as indium tin oxide (ITO), and a grid of pixel electrodes 9 on the lower substrate are used to apply voltage to the liquid crystal layer. Thin-film transistors (TFTs) 7 are used to control the pixel electrodes, and a so-called 'via' connection 8 is made through a passivation and planarisation layer 13 to the pixel electrodes 9.

In the transmissive display (a), crossed external polarisers 3 are placed on the outer surfaces of the substrates. The pixel electrodes 9 are also transparent. Applying voltage to the liquid crystal layer changes the orientation of the liquid crystal molecules, and this affects the polarisation of light passing through the display from the backlight 11. In states where the polarisation is unchanged, the pixel appears black, and in states where the polarisation is changed, light is transmitted and the pixel appears bright. The colour-filter substrate 2 has on its inner surface red, green, and blue colour filters 4. Alignment layers 6 (typically polyimide) control the alignment of the liquid crystal molecules. Examples also exist where the polarisers are oriented with their transmission directions parallel, so that when the polarisation is unchanged, the display appears white.

Reflective liquid crystal displays can be constructed using a wide variety of different methods. In the reflective display example shown in FIG. 1b, the pixel electrodes 9 are typically made of specularly reflective metal but may also be made of a light absorbing conductor, which for example could be made from a layer of a transparent conductor together with a black mask underneath the conductor. The liquid crystal layer 10 consists of a polymer network and regions of liquid crystal. With voltage applied, the molecules in the liquid crystal orient so that there is little refractive index contrast between the two types of domain, and the liquid crystal layer is transparent. With specularly reflective electrodes used as pixel electrodes, the appearance of the pixel is similar to that of a mirror, and it appears dark unless a light-source happens to be in the correct position for its light to reflect specularly into the viewer's eyes. In the case of the pixel electrodes made of light absorbing conductor, the appearance of the pixel is dark. With no voltage applied, the liquid crystal domains orient randomly, and the resulting index contrast causes scattering of light. The pixel appears bright.

This type of display is known as a polymer network liquid crystal display (PN-LCD). Details of the technology are given by H. Hasebe et al in the *Journal of photopolymer science and technology*, volume 10(1) pp 25-30 (1997) and by T. Fujisawa et al, in the same journal, volume 11(2), pp 199-204 (1998). A display of this type with reflective pixel electrodes is described, for example, by Y. Asaoka et al in *SID Symposium Proceedings* 2009 paper 29.1. The paper by Asaoka et al also describes how memory elements may be incorporated into each pixel, in order to reduce the power required to sustain an image on the display.

A PN-LCD display with a reflecting layer behind the liquid crystal cell appears brighter than one with a dark layer behind, because light which is scattered to the reflector can be reflected back to the scattering layer and either transmitted or scattered again to reach the viewer's eyes. This brightness improvement is important because to achieve a driving voltage low enough for operation with an active matrix (TFT) driving circuit, the PN-LCD layer must be made with a small thickness (of order 5 μm). This small thickness leads to relatively weak scattering, and little back-scattering. In this case, most of the scattered light strikes the reflecting layer, and so the reflecting layer is necessary for high brightness. However the reflecting layer has the disadvantage of increasing the brightness of the dark state, and therefore reducing the contrast.

In the PN-LCD displays mentioned above, the PN-LCD layer scatters light when no voltage is applied, and is transparent when voltage is applied. It is also possible to make a PN-LCD display where the zero-voltage state is transparent, and applying a voltage causes scattering. Examples are U.S. Pat. No. 7,102,706 (Kim; Boe Hydis), U.S. Pat. No. 5,188,760 (Hikmet; Philips), and the article by Sonehara et al in *SID Symposium Proceedings* 1997 pp 1023-6.

For simplicity, there are a number of components omitted from these diagrams, including insulation layers, other features used to align the liquid crystal, addressing circuits and black masks. Also the details of construction vary from one type of display to another.
Other Scattering-Mode Reflective Displays Other methods exist for making a display pixel switch between scattering and transparent states. Polymer-dispersed liquid crystals (PDLCs) are well known (see, for example, L. Bouteiller and P. Le Barry, 'Polymer-dispersed liquid crystals: preparation, operation and application', *Liquid crystals* vol 21, pp 157-174 (1996)). In these devices, droplets of liquid crystal are dispersed in a polymer matrix. However these devices normally operate at voltages too high to be compatible with active-matrix (TFT) driving circuits.

In addition to the polymer-network liquid crystal displays described above, there are some other methods of making a liquid crystal scattering display with low driving voltage. An example is given in U.S. Pat. No. 5,539,556 (Demus; Chisso, Inc.), where droplets of liquid crystal are suspended in a fluid which does not mix with the liquid crystal.

There are also ways of making scattering-mode reflective displays which do not use liquid crystals at all, for example, electro-wetting and in-plane electrophoretic displays. In the most common electro-wetting geometry, the device consists of a mixture of two immiscible fluids, one of which is black, and the other of which is transparent (see, for example, R. A. Hayes & B. J. Feenstra, "Video-speed electronic paper based on electrowetting", *Nature*, Vol. 425, pp 383-385 (2003)), Situated behind the fluids is a scattering white reflector. Since it is possible to control the position and area occupied by the black fluid, it is therefore possible to either cover with black, or reveal the white scatterer to the viewer within any one particular pixel, thereby creating what effectively amounts to a scattering-mode display, although none of the fluids changes between scattering and transparent (they are merely moved about as required). A less conventional way to achieve the same effect would be to use electro-wetting fluids which were transparent and white, with a black background (rather than transparent and black, with a white background). Likewise, similar effects can be achieved using black or white electrophoretic particles suspended in a transparent fluid.

Photovoltaic Elements

One type of known photovoltaic element is a thin film solar cell. A review of thin-film solar cell technology can be found in the paper by K. L. Chopra, "Thin-Film Solar Cells: An Overview", *Prog. Photovolt., Res. Appl.,* 2004, vol 12, pp 69-92. Thin film solar cells comprise a plurality of thin layers (or films) of materials, typically 10 nm-10 µm in thickness, deposited in a stack on a supporting substrate 17 (FIG. 2*a*). The thin film stack typically comprises at least two conducting layers 16 and 14, and a light absorbing layer 15. A thin film solar cell, like other types of solar cells, exploits the properties of a light absorbing layer to convert light energy to electricity by the photovoltaic effect. Free charge carriers generated from the absorption of photons in the light absorbing layer are transported under the influence of an internal potential gradient to the conducting layers where they are collected and used to power an external circuit.

The construction of the solar cell is designed so as to accept and absorb as much incident light as possible for maximum efficiency. At least one of the conducting layers 16, known as the front contact, must allow the incident light 19 to pass to the light absorbing layer. For example, this is achieved if the conducting layer is patterned so that regions within the layer have no conducting material. The conducting material may be arranged in stripes which are known as finger contacts. Alternatively, the conducting layer may be transparent to light of the required wavelength range 16*a*. Examples of common transparent conducting layers are Indium Tin Oxide (ITO), Fluorine doped Tin Oxide (SnO2:F), or aluminium doped zinc oxide (ZnO:Al).

Optionally the front contact may comprise two or more layers. For example, finger or grid contacts 16*b* and a transparent conducting layer 16*a* can be combined 16 to achieve optimum light transmission and minimize sheet resistance and light absorption and reflectivity of the conducting layer. In another example additional layers may be added to minimize reflections or increase light trapping. The front contact may include further additional features to optimise its electrical or optical properties. For example, the interface between the conducting layer and the light absorbing layer may be roughened to prevent reflections and promote light trapping as described in the paper by Zeman et al., "Optical modeling of a-Si:H solar cells with rough interfaces: Effect of back contact and interface roughness", *J. Appl. Phys., vol* 88 (11), 2000, pp 6436-6443.

The second conducting layer 14, known as the back contact, is typically reflective in order to increase the path length of the incident light in the light absorbing layer. Typical materials that are used for the reflective back contact are silver, chromium, or aluminium. The back contact may also comprise one or more additional features to scatter the reflected light and further increase the path length in the light absorbing layer. For example, the back contact 14 may combine a reflective metal 14*a* with an additional transparent layer 14*b* such as aluminium doped Zinc Oxide (ZnO:Al) designed to promote light scattering. One or more of the back contact layers may be subjected to processes, such as etching, designed to increase its roughness and further promote scattering.

Typically the light absorbing layer is an inorganic semiconductor such as silicon, although many other materials can be substituted, including organic semiconductors, dyes and electrolytes. Typically the light absorbing layer will include at least one semiconductor junction between sub-layers of different electrochemical potential in order to create an internal potential difference. A semiconductor junction is typically obtained by combining two materials of different composition. Variations in material composition can be achieved by differently doping the same semiconductor or by combining different materials. The light absorbing layer 15 in silicon thin film solar cells typically comprises thin highly p-doped 15*c* and n-doped 15*a* sub-layers either side of a thicker intrinsic (i-) silicon layer 15*b* to form a p-i-n junction.

Thin film solar cells are typically constructed with one of two types of configuration. A "substrate configuration" (FIG. 2*a*) is defined when the supporting substrate is adjacent to the back contact. In this configuration the substrate is not required to be transparent. Alternatively, a "superstrate configuration" (FIG. 2*b*) is defined when the supported substrate 18 is adjacent to the front contact 16*c*. In this case the substrate is required to be transparent to allow light to enter the solar cell.

Incident light is not absorbed or is weakly absorbed if the photon energy is smaller than the band gap of the light absorbing layer. On the other hand, if the photon energy is greater than the band gap, the excess energy will be lost in the form of heat. To increase the efficiency of the solar cell, additional light absorbing layers 20 composed of materials with different photoelectric properties may be stacked on top of each other (FIG. 3). As with the first light absorbing layer 15, each sub-cell in the stack also comprises n-doped 20*a*, intrinsic 20*b* and p-doped 20*c* sub-layers, but absorbs a different part of the solar spectrum; hence the overall absorption of the solar cell and therefore the efficiency is increased. This type of thin film solar cell with two or more light absorbing layers is known as a multijunction thin film solar cell. Examples of commonly combined materials for multijunction silicon thin film solar cells are amorphous silicon, microcrystalline silicon, silicon carbide, and silicon-germanium, although other materials and combinations are well known. A review of silicon-based thin-film technology can be found in the paper by A. V. Shah et al, *Prog. Photovolt. Res. Appl.,* 2004, vol 12, pp 113-142.

Photovoltaic functions can also be achieved by thin films of polymers. A recent review summarises these devices. ('Polymer based photovoltaics: novel concepts, materials and state-of-the art efficiencies', J. M. Kroon et al, *Proceedings of the 20th European Photovoltaic Solar Energy Conference and Exhibition*, Barcelona 2005). Polymer-based PV cells show much lower efficiency than inorganic PVs, but have the advantage of lower-cost production processes, including solution processing (for example, see Wang et al, Applied Physics Letters vol 95, 043505 (2009)).

In addition to silicon and polymers, thin film solar cells based on other materials exist. Well known examples are based on Copper Indium Gallium Selenide ($CIGSe_2$), Copper Indium Gallium Sulfide ($CIGS_2$), Cadmium Telluride (CdTe), Any of these or other thin film solar cell technologies may be preferred on the basis of their intended application/function, efficiency, cost, environmental impact, process compatibility, wavelength range of operation, or aesthetic (e.g. colour/appearance). For an overview of different thin film solar cell technologies see *Thin Film Solar Cells: Fabrication, Characterization and Applications*, Ed. J. Poortmans and V. Arkhipov, published by Wiley, 2006.

The construction of many thin film solar cells is such that additional layers are required between the incident light and the light absorbing layer to improve the overall performance of the cell. Such layers (sometimes known as window layers) do not contribute to the photocurrent. Furthermore, the bandgap of the window layers is chosen to be larger than that of the light absorbing layer in order to allow light to pass through. However, the window layer will absorb photons with energies greater than its band gap, and therefore prevent the photons from passing through to the light absorbing layer. For example, a CdS buffer layer is commonly used in the case of CIGS and CdTe thin film solar cells. CdS absorbs light of wavelengths shorter than approximately 500 nm. ZnO and ITO are commonly used as the transparent conducting layers but also typically absorb light of wavelengths less than approximately 350 nm. As a result of these factors thin film solar cells typically only make efficient use of a region of the solar spectrum between a lower limit set by the band gap of the light absorbing layer and an upper limit set by any additional windows layers in the cell. For a description of the light absorbing properties of several common thin film solar cells see Jenny Nelson, *The Physics of Solar Cells*, Imperial College Press, 2003, page 213-214. Figures showing the external quantum efficiency of some thin film solar cell technologies can be found in various publications, including: for amorphous silicon, Meier et al., "High-efficiency amorphous and micromorf silicon solar cells", Proc WCPEC 3, 2003, S20-89-06; for CIGS, Kaigawa, "Improved performance of thin film solar cells based on Cu(In,Ga)S$_2$", *Thin Solid Films*, 2002, 415, p 266; and for CdTe, A. D. Compaan, MRS Symp. Proc., 2004, 808, A7.6.

During fabrication of large area thin film solar cells (typically greater than 1 cm$^2$), a single solar cell may be subdivided into many smaller solar cells to form a solar module. The individual cells are typically approximately 1 cm wide, although their length may vary, and are connected in series to the adjacent cells forming a cascade of cells. The sub-division of large cells into smaller cells and their connection series reduces the current output produced by each cell thereby reducing Joule losses due to the sheet resistance of the conducting layers. Series connection also allows the total output voltage of the cells in the cascade to be increased to a more suitable level for the external circuit to which they are connected.

Series connections are typically achieved by "monolithic contacts" between adjacent cells. Monolithic contacts made by a sequence of three cutting steps, each of which cuts through different layers in the cell in order to connect the back contact of one cell to the front contact of the adjacent cell (FIG. 13). The first cut 42 is made after the back contact is deposited and separates the back contacts of neighbouring cells (FIGS. 11*a* & *b*). The second cut 43 is made after deposition of the light absorbing layer and is off-set from the first cut (FIGS. 11*c* & *d*). The second cut separates the light absorbing layer and opens a via so that the front and back contacts of adjacent cells can be electrically connected. The third cut 44 is made after deposition of the front contact layers and separates the front contact of neighbouring cells (FIGS. 11*e* & *f*). The cuts are commonly performed by laser scribing, although lithographic methods can also be employed. A detailed description of this laser scribing process can be found here: C. M. Dunsky, *Industrial Laser Solutions*, February 2008. (http://www.coherent.com/Downloads/80410-038e-ILS.pdf).

FIG. 14*b* shows a simple equivalent circuit diagram for one solar cell including the monolithic contact region. By common convention the solar cell is represented by a current source and diode in parallel. The resistors R1 to R5 (excluding R3) approximate the series resistances arising from the front and back contact layers. R3 is a shunt resistance which accounts for leakage between neighbouring back contacts through the n-type a-Si layer. FIG. 15 shows an exemplary circuit diagram of a module containing six solar cells monolithically connected in two parallel cascades of three cells each. A detailed description of the monolithic contacts can be found in the paper by Brecl and Topic, "Simulation of losses in thin-film silicon modules for different configurations and front contacts", *Prog. Photovolt: Res. Appl.*, 16, 2008, pp 479-488.

Monolithic contacts reduce the active area 41 of the cell since they produce a dead region 40 around the contact area which does not contribute to the photocurrent (FIG. 13). The cell width must be optimized to balance the loss of active area 40 arising from having more contacts with reduced Joule losses arising from the lower current passing through the cells. A detailed description of the losses and their relationship to the cell and interconnect dimensions is provided by Gupta et al., "Optimisation of a-Si solar cell current collection", *Proceedings of the 16$^{th}$ IEEE Photovoltaic Specialists Conference*, 1982, pp 1092-1101

Combined Displays and Photovoltaic Elements

A number of patents describe methods of combining photovoltaic (PV) elements and displays in the same area.

The simplest method is to manufacture PV and display separately and place the PV behind the display. This is a workable method when the display is driven by a passive matrix, so that the display electronics do not obscure the PV. U.S. Pat. Nos. 6,518,944 (Doane; Kent Displays), 5,523,776 (Hougham; IBM), 7,206,044 (Li; Motorola) and patent application US20050117096 (Voloschenko; Motorola) describe this arrangement. This method has two disadvantages: since separate substrates are used for the display and the PV, the weight and thickness of the combined device are large; and when an active matrix is used in the display, the electronics of the active matrix absorb some light before it reaches the PV, reducing the PV efficiency.

An alternative arrangement is to place the PV and the display electronics in the same layer. This has the advantage that it may save manufacturing steps and so reduce cost. For example, each pixel may have silicon layers that in one part of the pixel act as a TFT and in another part of the pixel act as a photovoltaic element. U.S. Pat. Nos. 6,323,923 (Hoshino; Seiko-Epson) and 6,452,088 (Schmidt; Airify) describe this arrangement. Again, the efficiency of the PV is reduced in this arrangement because it occupies only part of the available area. The energy of light striking parts of the display area not covered by PV is lost.

Similarly, U.S. Patent Application No. 20070102035 (Yang) describes an arrangement where part of a transmissive display is obscured by a black mask with an integrated PV function. Again, the disadvantage is that because the PV occupies only a small part of the area, it can gather only a small part of the light energy falling on the device.

Two patent applications (US20090103165, US20090103161: Kothari; Qualcomm) describe devices where PV elements are combined with a MEMS display. In both cases, electronics on the top substrate drive a MEMS device, and PV elements are placed either outside the substrates or on the lower substrate. In the first case, the PV device partly obscures the display, and in the second case the display obscures the PV.

There are also patents where a PV element is combined with an organic LED display. An example is U.S. Patent Application No. 20090219273 (Nathan; Ignis Inc.). This patent also mentions a liquid crystal display as a possibility, but does not give details.

SUMMARY OF THE INVENTION

From the above-summary of the prior art, it can be seen that no method exists to combine a PV element with an active-matrix reflective display element in such a way that the two elements share the same area and are both able to make use of light entering the display efficiently.

In accordance with the present invention, an integrated reflective display and photovoltaic (PV) device is constructed so that the PV element is placed below the optically active part of the display, but above the driving electronics for the display. FIG. 4 shows an example of a combined display and PV element with this arrangement. Light striking the device from the outside therefore first encounters the optically active part of the display, and then (if it is not reflected or scattered by the optically active part) encounters the PV element. The display electronics are underneath the PV element and so do not affect the optical properties of the device. Via connections make electrical contact between the display electronics and the optically active part of the display. Advantages of the device and method in accordance with the invention include the following.

By combining the PV element and the display in the same area, space is saved. This is particularly important in mobile devices, where it is advantageous to use a large area for displaying information (to improve readability of information and make the device easy to use) and also for PV (to generate as much power as possible).

Because the PV element is below the optically active part of the display, it does not obscure the display. Because the electronics are below the PV element, the electronics do not obscure the PV element.

Reflective displays generally have a lower power consumption than transmissive or emissive displays, and therefore have the advantage in this application that they may be powered partly or wholly by the PV element.

The display device may be a reflective display which is switched between a scattering and a non-scattering state. An example is a polymer network liquid crystal. Such a device has the advantage of low-voltage operation compatible with amorphous silicon or polysilicon thin-film transistors.

The polymer-network liquid crystal display device may be either of the positive type, where scattering is removed by applying voltage, or of the reverse type, where scattering is increased by applying voltage. The positive type has the advantage of being easier to manufacture. The reverse type has the advantage that no power is consumed by the display in its most transparent state, and is therefore more suitable for operation as a photovoltaic element when no image is being displayed.

The scattering reflective display device may be a different liquid crystal mode which operates at a voltage low enough for active matrix backplanes: for example the mode described by Demus in U.S. Pat. No. 5,539,556.

The scattering reflective display device may be a non-liquid crystal mode, such as an electrowetting mode or an in-plane electrophoretic mode. Since in the case of this invention the appearance of the solar cell is substantially dark (because it is a good absorber of visible light), it is appropriate to use the example of white and transparent fluids in the case of an electro-wetting mode, and white particles suspended in a transparent fluid in the case of an in-plane electrophoretic mode.

Finger electrodes in the PV element may be arranged with the same pitch as the pixel pitch of the display device. This has the advantage of avoiding moiré fringes or other observable patterns in the display.

The electrodes of the PV element may be highly reflective, or coated with material to make them highly reflective. This has the advantage that the brightness of the reflective display may be increased.

The electrodes of the PV element may have low reflectivity, or are covered by or coated with material to give them low reflectivity. This has the advantage that the contrast ratio of the reflective display may be increased.

The PV element may be an amorphous silicon thin-film photovoltaic device. This has the advantage of well-developed manufacturing methods and small thickness.

The PV element may be a multiple-layer structure, for example including amorphous silicon and microcrystalline silicon layers. This type of structure is thicker but will provide higher efficiency.

The PV element may be a polymer-based thin film structure. This would provide lower production costs than inorganic thin-film photovoltaics.

The PV element may be a Copper Indium Gallium Selenide or Sulfide thin film structure. This type of structure is less well develop manufacturing methods but provides higher efficiency.

The device made according to the invention may be manufactured by a process where the PV element is placed on top of the display electronics, followed by an etching step which cuts through the PV element to allow contact between the display and the electronics, as shown in FIGS. 6 and 7.

The structure of the device in accordance with the invention may include an etch-stopping layer of metal or some other etch-resistant conductive material. This etch-stopping layer allows an etching step to cut through the PV layer to provide a contact to the display driving electronics without destroying the driving electronics, as shown in FIG. 6.

The device made in accordance with the invention may have an additional reflecting layer 36, as shown in FIG. 9. This reflecting layer is designed to reflect wavelengths of light which are not in the range which is used most efficiently by the PV layer. In this way the brightness of the display is improved without causing a large reduction in efficiency of the PV element.

Alternatively, the additional reflecting layer 36 may reflect different wavelength bands in different pixels. For example, in each group of three pixels, one pixel may reflect red strongly, one may reflect green strongly, and one may reflect blue strongly. In this way the display can be used to show colour images with only a small decrease in photovoltaic efficiency compared to the monochrome version of the device.

Alternatively, the additional reflecting layer 36 may reflect all or part of the visible spectrum while transmitting infra-red light, while the PV element is optimized to absorb infra-red light. For example, the PV element may be a cadmium telluride photovoltaic element. Again, this has the advantage of improving the brightness of the display while allowing the PV element to generate electrical power efficiently.

Alternatively, the additional layer 36 may comprise a periodic array of conducting nanostructures that support surface plasmons. The array of nanostructures may be designed to enhance light trapping and absorption of specific wavelengths by the PV element as described by Pala et al., Adv. Mater., 21, (2009), 3504-3509. In this way the spectrum and/or intensity of the reflected light may be controlled in order to improve the brightness of the display or show colour images, as described above, while simultaneously substantially preserving or increasing the efficiency of the PV element.

Alternatively, the additional layer 36 comprising a period array of conducting nanostructures may be combined with layer 16 to provide the dual function of enhanced light absorption by, and carrier extraction from the PV element.

Alternatively, the additional layer 36 may not be reflective in the conventional sense, but be composed of a dielectric material with a relatively low (n<1.35) refractive index. The purpose of inserting such a layer is that when the liquid crystal is in the non-scattering state, the incident light passes directly into the solar cell (aside from reflection losses), but in the scattering state, a significant fraction of the scattered light radiating from the PNLC layer is reflected away from the solar cell and back to the viewer, via the well-known process of total-internal-reflection. Some light will always pass into the solar cell, as before, but a greater fraction is reflected back to the viewer, resulting in a brighter display, without compromising the quality of the dark state by introducing reflectors into layer 36. Here, the low index layer occupies the position of layer 36 in FIG. 9. However, an alternative arrangement is for the low index layer 36 and the insulating layer 31 to be situated above the lower electrode for the PNLC layer. This has the disadvantage that some of the driving voltage for the PNLC layer will be dropped across inactive dielectric layers, but the advantage that the via hole necessary to connect the pixel electrode to the TFT circuitry is much shorter.

The PV element can be sub-divided into smaller PV elements that are cascaded in series by monolithic contacts where the pitch of the monolithic contacts is an integer multiple of the pixel pitch. This as the advantages of 1) avoiding moiré fringes or other observable patterns on the display; 2) decreasing output current of the smaller PV elements thereby reducing series resistance losses; 3) increasing the output voltage of the cascade to improve compatibility with external circuits to which they are connected.

Each smaller PV element in a single cascade can be further sub-divided to form two or more cascades. Each cascade can be connected in parallel to the other cascades. This has the advantage of reducing the impact of partial shading of the display on the efficiency of the PV layer.

According to one aspect of the invention, a display device includes: a first layer comprising an optically active display portion; a second layer comprising a photovoltaic element; and a third layer comprising electronics operatively coupled to the first layer, said electronics configured to drive the optically active display portion, wherein the second layer is arranged between the first and third layers.

According to one aspect of the invention, the display device further includes: a common electrode; a plurality of pixel electrodes, wherein the first layer is arranged between the common electrode and plurality of pixel electrodes; and a plurality of conducting connectors corresponding to the plurality of pixel electrodes, wherein the conducting connectors electrically couple a respective pixel electrode to the electronics.

According to one aspect of the invention, the display device further includes a plurality of finger electrodes arranged on an upper surface of the photovoltaic element, wherein the optically active display device includes a plurality of pixels having a predetermined pixel pitch, and the plurality of finger electrodes have a pitch corresponding to the predetermined pixel pitch.

According to one aspect of the invention, the plurality of finger electrodes comprise a reflective substance.

According to one aspect of the invention, the first layer comprises at least one of an electrowetting layer or an in-plane electrophoretic layer.

According to one aspect of the invention, the first layer comprises a layer of amorphous silicon and a layer of microcrystalline silicon.

According to one aspect of the invention, the display device further includes a reflective layer arranged between first layer and the second layer.

According to one aspect of the invention, the photovoltaic element comprises a cadmium telluride photovoltaic element.

According to one aspect of the invention, the optically active display device includes a plurality of pixels, and wherein the reflective layer is non-uniform so as to reflect different colours of light from different sub-pixels of the plurality of pixels in a repeating pattern.

According to one aspect of the invention, the reflective layer is configured to reflect wavelengths of light that are not in a range of light efficiently used by the photovoltaic device.

According to one aspect of the invention, the photovoltaic device is optimized to absorb infra-red light, and the reflecting layer is configured to reflect at least part of the visible spectrum while transmitting infra-red light.

According to one aspect of the invention, the display device further includes a conductive layer, wherein the reflective layer is combined with the conductive layer.

According to one aspect of the invention, the reflective layer has a refractive index n less than 1.35.

According to one aspect of the invention, the display device further includes: a pixel electrode arranged between the first layer and the second layer; and an insulating layer, wherein the reflective layer and the insulating layer are arranged between the pixel electrode and the first layer.

According to one aspect of the invention, the photovoltaic element is sub-divided into a first plurality of photovoltaic elements cascaded in series with one another.

According to one aspect of the invention, the display device is a reflective display device.

According to one aspect of the invention, the optically active display portion comprises a reflective display device, and the electronics are configured to switch the reflective display device between a scattering and non-scattering state.

According to one aspect of the invention, the display device comprises a polymer-network liquid crystal display (PNLCD) device.

According to one aspect of the invention, the display device is at least one of a positive-type PNLCD or a reverse-type PNLCD.

According to one aspect of the invention, the optically active display portion operates in an electrowetting mode.

According to one aspect of the invention, the photovoltaic element comprises at least one of an amorphous silicon thin-film photovoltaic device, a multiple layer structure, a polymer-based thin-film structure, or a copper indium gallium selenide or sulfide thin-film structure.

According to one aspect of the invention, the first layer comprises a single layer of amorphous silicon.

According to one aspect of the invention, a method of making a display device includes: forming driving electronics on a substrate; forming a photovoltaic element over the driving electronics, including forming a first insulating layer between the photovoltaic element and the driving electronics;

placing an optically active display layer over the photovoltaic element; and forming a via through the first and second insulating layers, and forming a pixel electrode through the via and coupled to the driving electronics.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 1a-1b show schematic diagrams of conventional reflective and transmissive active matrix liquid crystal displays.

FIGS. 2a-2b show schematic diagrams of conventional substrate-type and superstrate-type configuration thin film solar cells.

FIG. 3 shows a schematic diagram of a conventional superstrate-type configuration multijunction thin film solar cell.

DESCRIPTION OF EMBODIMENTS

First Embodiment

Figure 4:
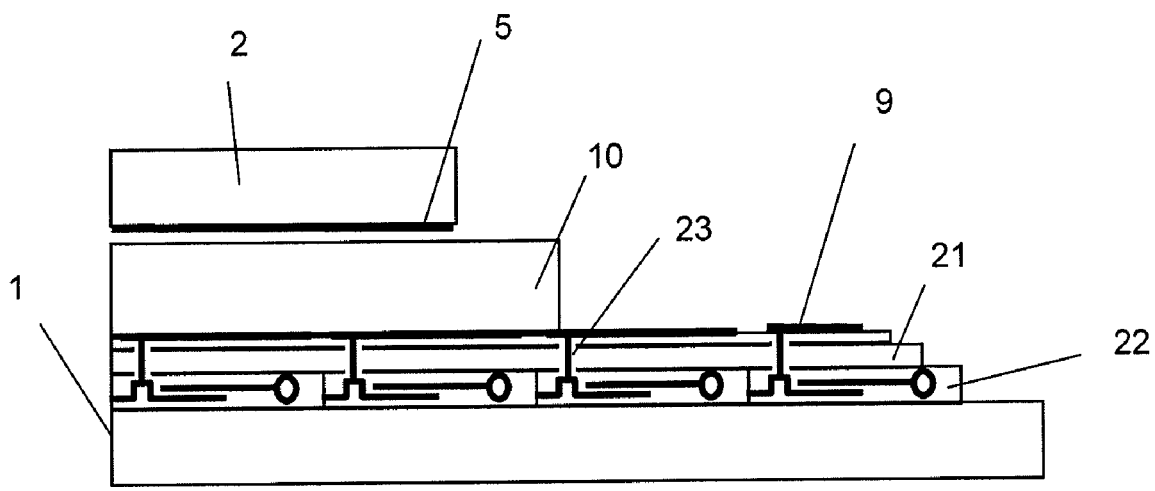
FIG. 4 shows an exemplary combined polymer-network liquid crystal display and photovoltaic element in accordance with the invention.

In a first embodiment of the invention, shown in FIG. 4, the display device is a polymer network liquid crystal display (PN-LCD), as described by Y. Asaoka et al in *SID Symposium Proceedings* 2009 paper 29.1 and in the other publications referred to above. The driving electronics include a memory device in every pixel which greatly reduces power consumption of the display. This memory device is also described in the paper by Asaoka.

Voltage is applied to the PN-LCD layer 10 by a transparent ITO common electrode 5 on the top substrate 2, and by ITO pixel electrodes 9 on the lower substrate 1. Below the pixel electrodes is a thin-film amorphous silicon PV element 21, which has the same structure as in FIG. 2(a). Each pixel electrode is connected to the driving electronics 22 for that pixel (which include a memory element as described above) by a conducting path or via connection 23 through the PV element 21.

Figure 5:
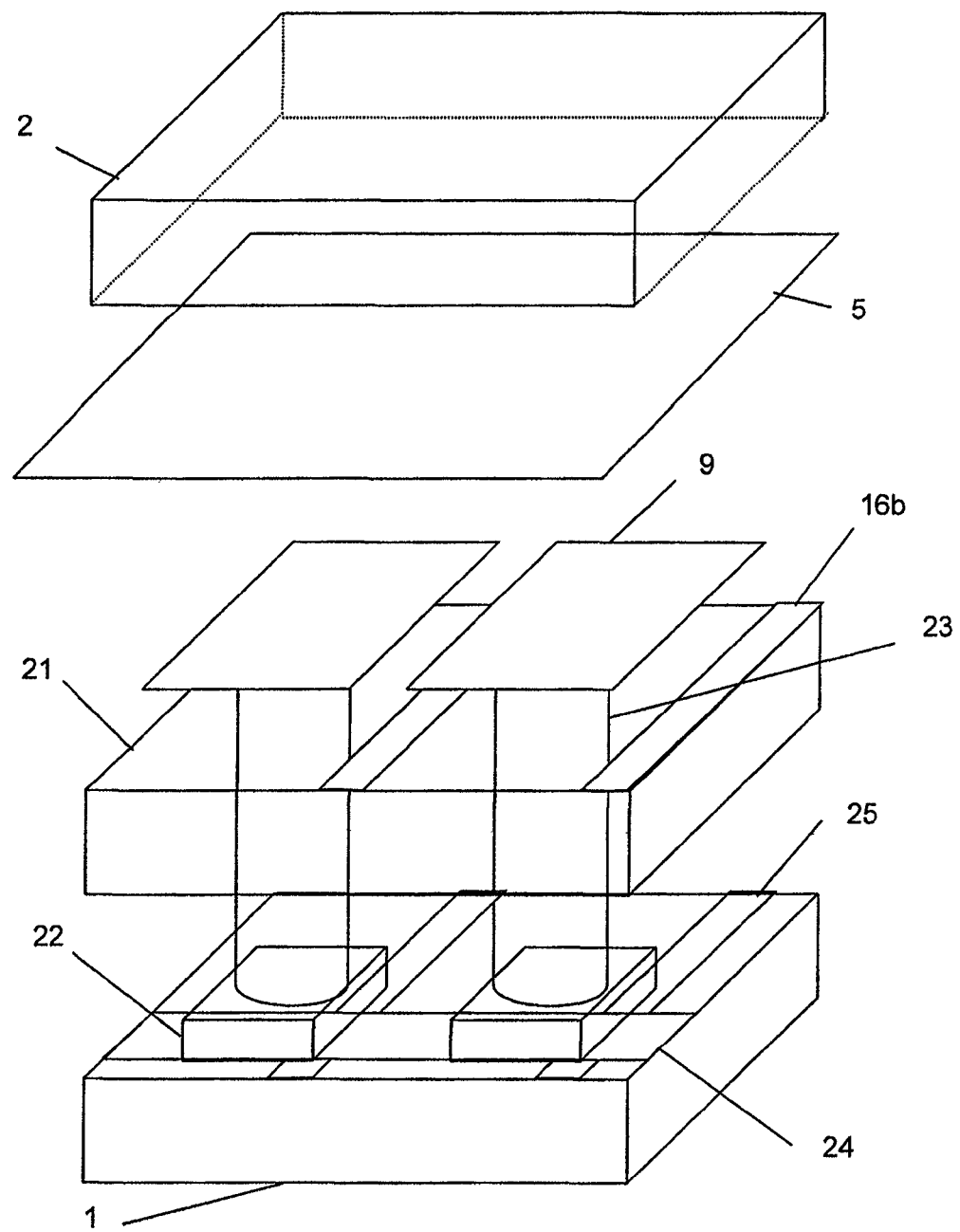
FIG. 5 shows the layer structure of an exemplary display in accordance with the invention, including the layout of spreading electrodes on the PV element and via connections for the display electronics.

FIG. 5 shows a schematic view of the structure of two adjacent pixels. Row lines 24 and column lines 25 address pixel driving electronics 22 on the lower substrate 1. A conducting connection 23 exists between each pixel electrode 9 and its driving electronics 22. This conducting connection passes through, but is electrically insulated from, the PV layer 21.

Finger electrodes 16b are placed on the upper surface of the PV element. They are patterned so as to have the same pitch as the pixel structure. This prevents two possible problems: (a) if the finger electrodes have a different pitch from the pixel structure but of the same order of magnitude, moiré fringes may be visible; (b) if the finger electrodes have a pitch much larger than the pixel pitch, then they will be visible to the viewer of the display.

The finger electrodes in this embodiment are made of aluminium and therefore reflect light. This reflection has the effect of increasing the brightness of the PN-LCD display.

Figure 6:
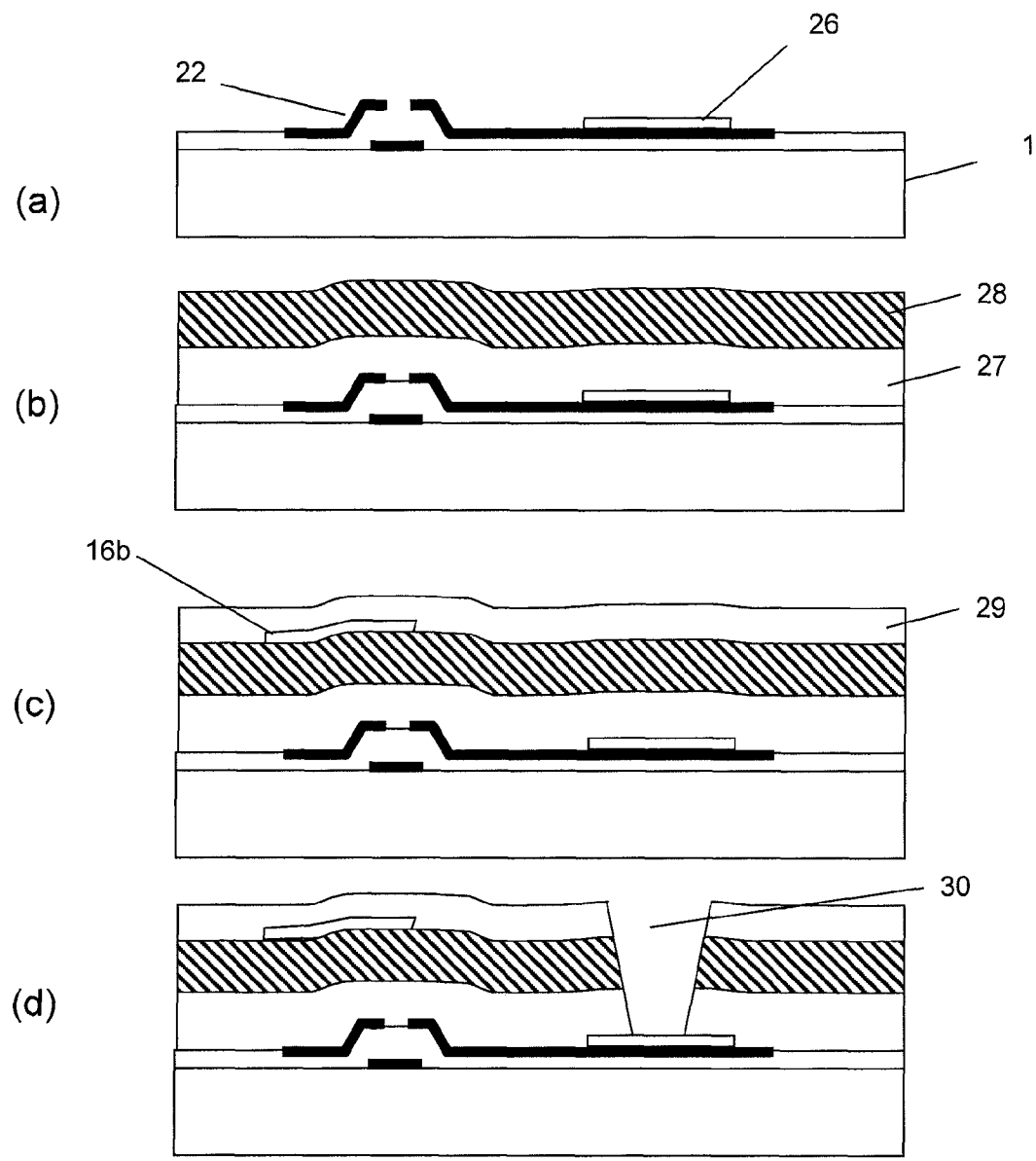
FIGS. 6a-6d show the first four steps in an exemplary process which may be used to manufacture a device in accordance with the invention.
Figure 7:
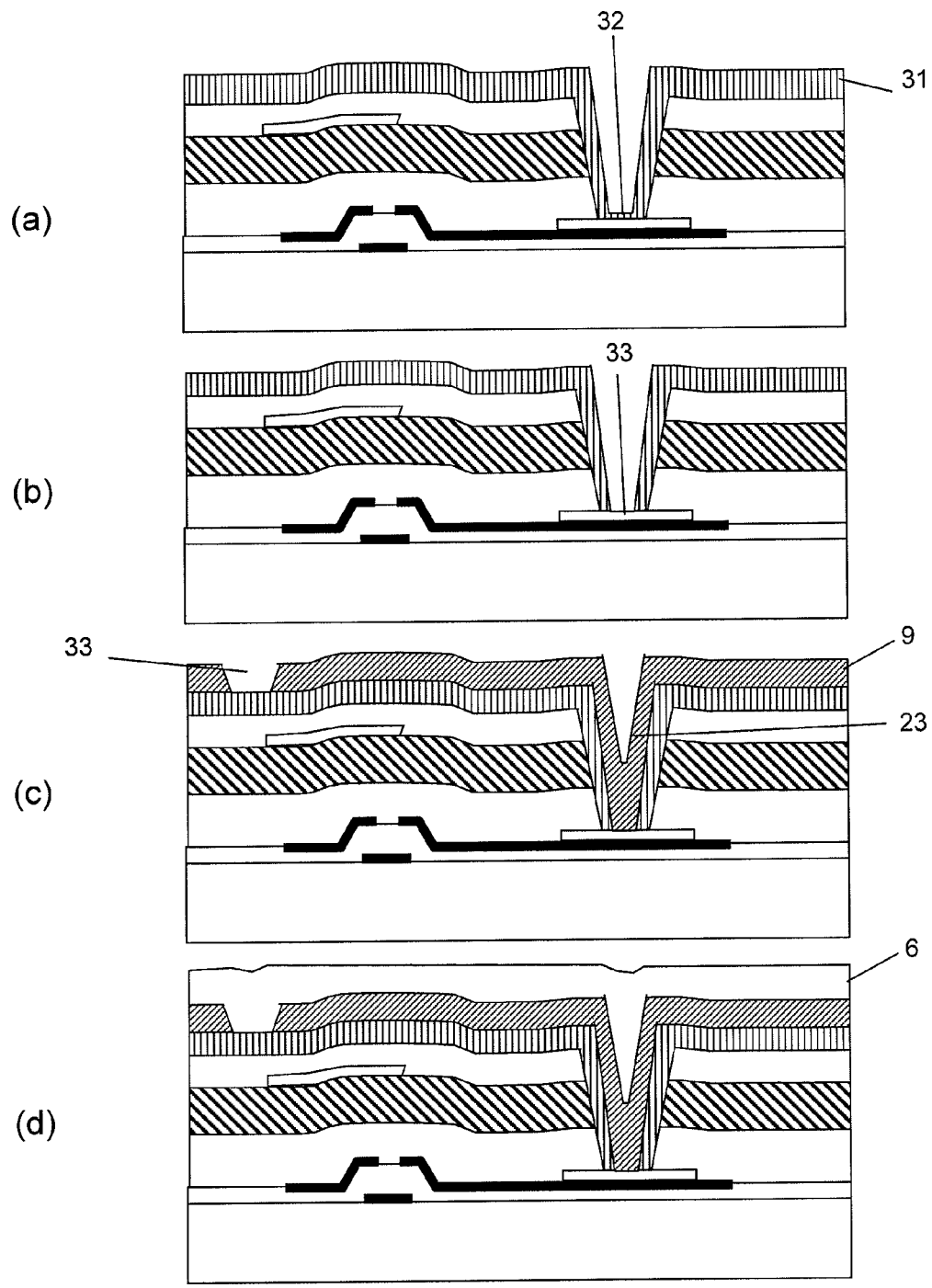
FIGS. 7a-7d show the following four steps in the exemplary manufacturing process that may be used to manufacture a device in accordance with the invention.

FIGS. 6 and 7 show manufacturing steps in the production of the lower substrate of the device. First, the driving electronics 22 are placed on the lower substrate 1, as in the standard display manufacturing process. An etch barrier 26, made of aluminium in this case, is placed using a resist mask and covers the area where the via connection will later be placed. In this example, the etch barrier covers only the area of the via connection. However in other embodiments of the invention it may cover essentially the whole area of the pixel. In any case, the etch barriers of adjacent pixels must be electrically isolated from one another, so some patterning is necessary. FIG. 6(a) shows the lower substrate after the etch barrier has been added.

The next step is to add an electrically insulating layer 27. In this example, a layer of silicon nitride is added by chemical vapour deposition. A thin-film amorphous-silicon photovoltaic element 28 is then added. This PV element has the structure shown in FIG. 2(a). FIG. 6(b) shows the substrate after this step.

The aluminium finger electrodes 16b are then added, and a further electrically insulating layer 29 (again, silicon nitride in this example) is placed on top. FIG. 6(c) shows the substrate after this step.

A reactive ion etch (RIE) is then used, with a resist mask which causes etching of a via hole 30 in the region of the etch mask. The etch mask stops the etch from penetrating further into the stack of elements, as shown in FIG. 6(*d*).

In the next step, shown in FIG. 7(*a*), another insulating layer 31 (silicon nitride in this example) is added. Because of the need for the deposited material to diffuse down the hole, the insulating layer 31 is thinner at the bottom of the hole 32 than elsewhere, as shown in FIG. 7(*a*).

In the next step, a RIE is again used. This etching step removes all of the thin layer of insulation at the bottom of the via hole to form a through-hole 33 through the insulating layer 31 surrounding the via hole, leaving part 33 of the etch barrier exposed, as shown in FIG. 7(*b*). Then indium tin oxide (ITO) 9 is added by sputtering, making a pixel electrode connected to the driving electronics by a conducting via connection 23. The pixel electrode is patterned using a resist process, as in the standard LCD manufacturing process, to make gaps 33 between the pixels. The result is shown in FIG. 7(*c*). An alignment layer 6 is then added.

Second Embodiment

A second embodiment of the invention is the same as the first embodiment except that the liquid crystal layer 10 is a reverse-mode polymer network LCD, as described, for example, in U.S. Pat. No. 5,188,760 (Hikmet; Philips) mentioned above.

Third Embodiment

A third embodiment of the invention is the same as the first embodiment except that the liquid crystal layer 10 is replaced with either an electrowetting or an in-plane electrophoretic layer.

Fourth Embodiment

A fourth embodiment of the invention is the same as the first embodiment except that the photovoltaic layer 21 is a two-layer device including a layer of amorphous silicon and a layer of microcrystalline silicon, as described by Shah et al, in *Solar Energy Materials & Solar Cells* volume 38, p 501 (1995). This type of device has higher photovoltaic efficiency than devices based on amorphous silicon only.

Fifth Embodiment

Figure 8:
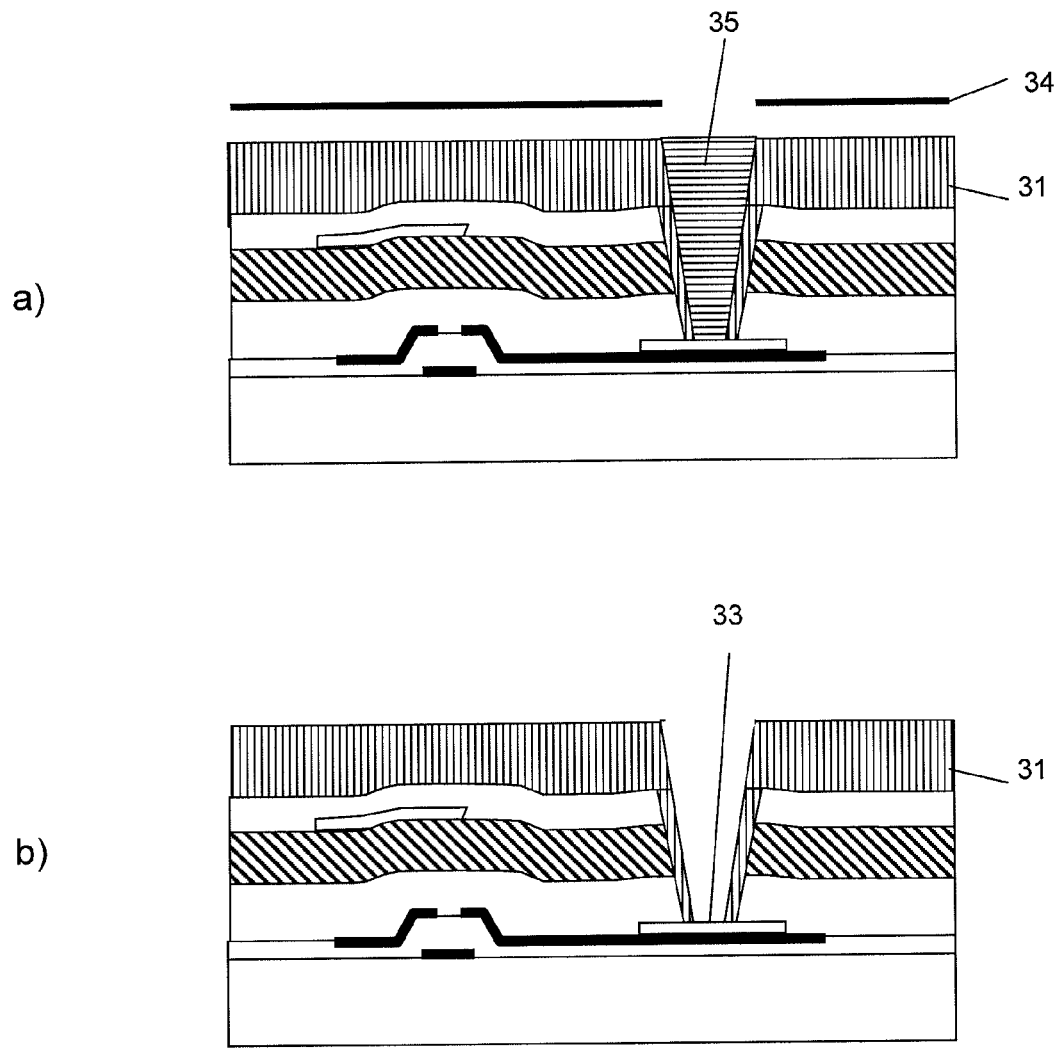
FIGS. 8a-8b show an alternative exemplary method from the one shown in FIG. 7 for making the insulating layer inside the via connection.

A fifth embodiment of the invention is the same as the first embodiment except that the insulating layer 31 is a positive or negative tone photopatternable resin or resist. The manufacturing procedure is illustrated in FIGS. 8*a* and 8*b*. The through-hole is formed by first applying a coat of the photopatternable resin and then either: 1) exposing the through-hole region 35 to light of a suitable wavelength (as in the case of a positive-tone resin) through a photomask 34 followed by development of the resin; or 2) exposing everywhere except the through-hole region to light of a suitable wavelength (as in the case of a negative-tone resin) followed by development of the resin.

Sixth Embodiment

A sixth embodiment of the invention is the same as the third embodiment except the insulating layer 31 also acts as a planarising layer.

Seventh Embodiment

Figure 9:
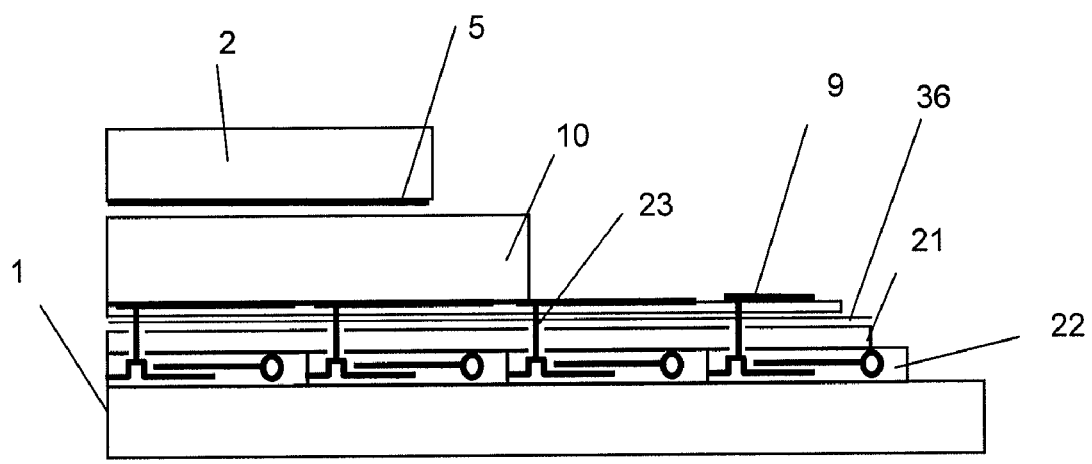
FIG. 9 shows an embodiment of the invention where there is an additional reflector to improve the brightness of the display.

A seventh embodiment of the invention is the same as the first embodiment, except that the PV element is a cadmium telluride photovoltaic element, and there is an additional reflecting element 36 as shown in FIG. 9. The reflecting element is a stack of dielectric layers deposited by vacuum methods and designed to reflect wavelengths shorter than approximately 600 nm while transmitting wavelengths longer than approximately 600 nm. Such elements are well known and can be bought from optical suppliers (e.g. Melles Griot, Albuquerque, N. Mex., US), and are known as 'cold mirrors' or 'cold light filters'. The cadmium telluride photovoltaic element is most efficient at generating electrical power from wavelengths greater than 600 nm, while the human eye is most sensitive to wavelengths less than 600 nm. High display brightness together with photovoltaic efficiency is therefore achieved.

Eighth Embodiment

Figure 10:
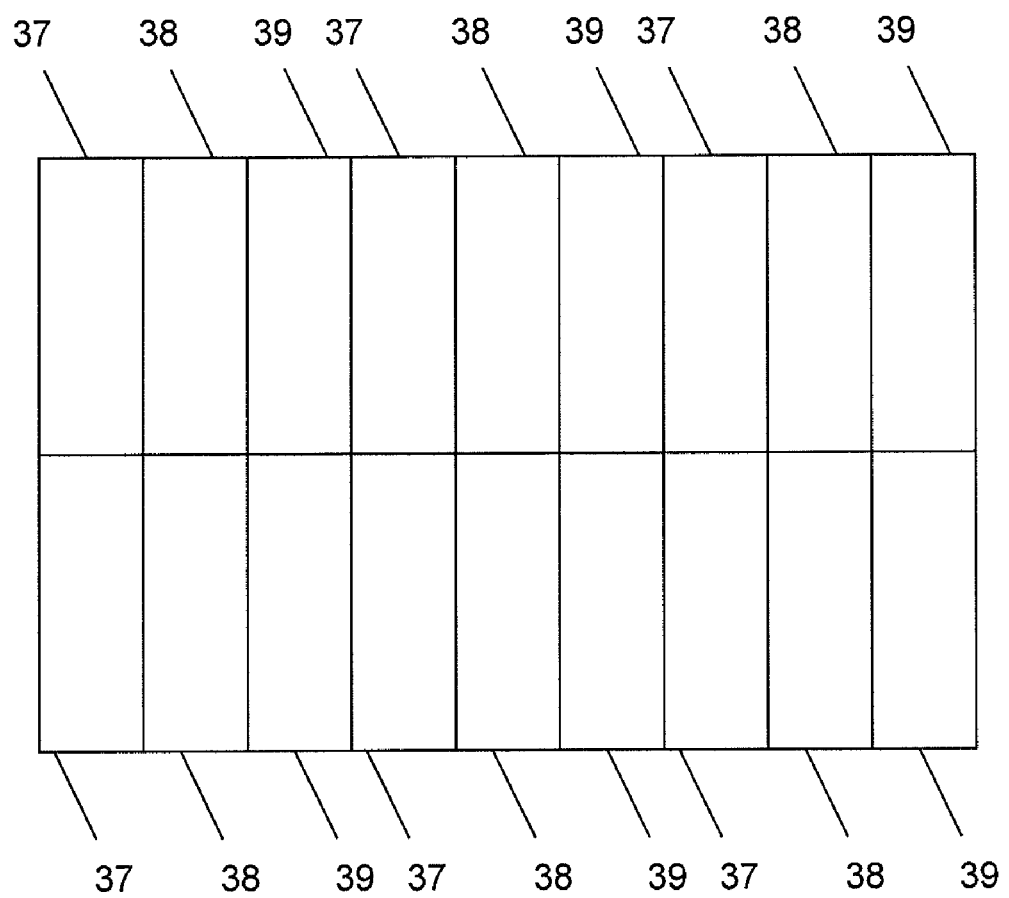
FIG. 10 shows an exemplary arrangement of colour sub-pixels in an embodiment of the invention including a colour display.

A eighth embodiment of the invention is the same as the first embodiment except for an additional reflecting layer 36 as shown in FIG. 9. In this embodiment, the reflecting layer is not uniform (in this embodiment the reflecting layer reflects different colours of light from different sub-pixels in a repeating pattern, enabling a colour display with high photovoltaic efficiency and brightness). Pixels are arranged in groups of three. FIG. 10 shows a view of this arrangement as seen from the front of the display: that is, as seen by a viewer of the display. In each group of three pixels, the first pixel 37 has a reflecting layer 36 which substantially transmits green and blue light, but substantially reflects red light; the second pixel 38 has a reflecting layer 36 which substantially transmits red and blue light, but substantially reflects green light; and the third pixel 39 has a reflecting layer 36 which substantially transmits red and green light and substantially reflects blue light.

In this way, the display is made able to show bright colour images while transmitting most of the light incident upon it to the photovoltaic element.

Ninth Embodiment

Figure 11:
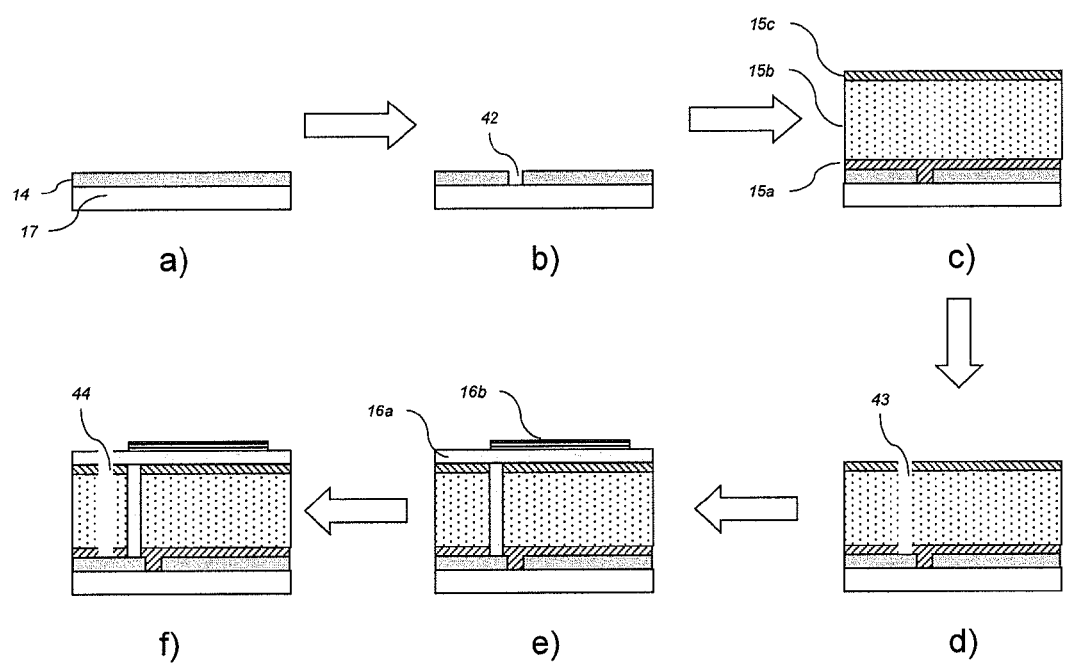
FIGS. 11a-11f show an exemplary method for forming monolithic contacts between adjacent solar cells in the PV layer comprising: a) deposition of the back contact layers, b) performing back contact separation cut, c) deposition of light absorbing layers, d) performing interconnect cut though light absorbing layer, e) deposition of front contact layers, f) performing isolation cut.
Figure 12:
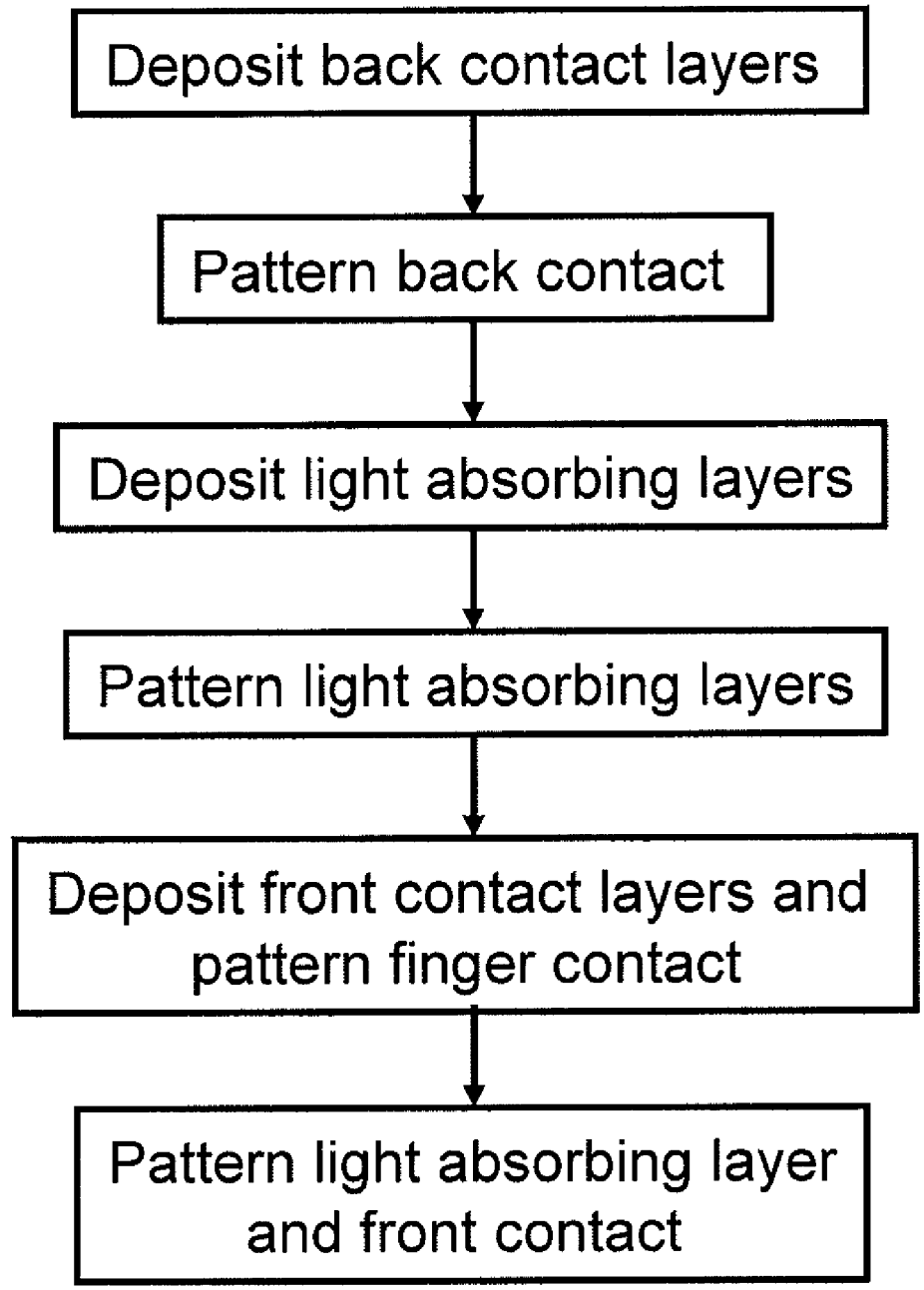
FIG. 12 shows an exemplary process flow chart for forming monolithic contacts between adjacent solar cells in the PV layer.
Figure 13:
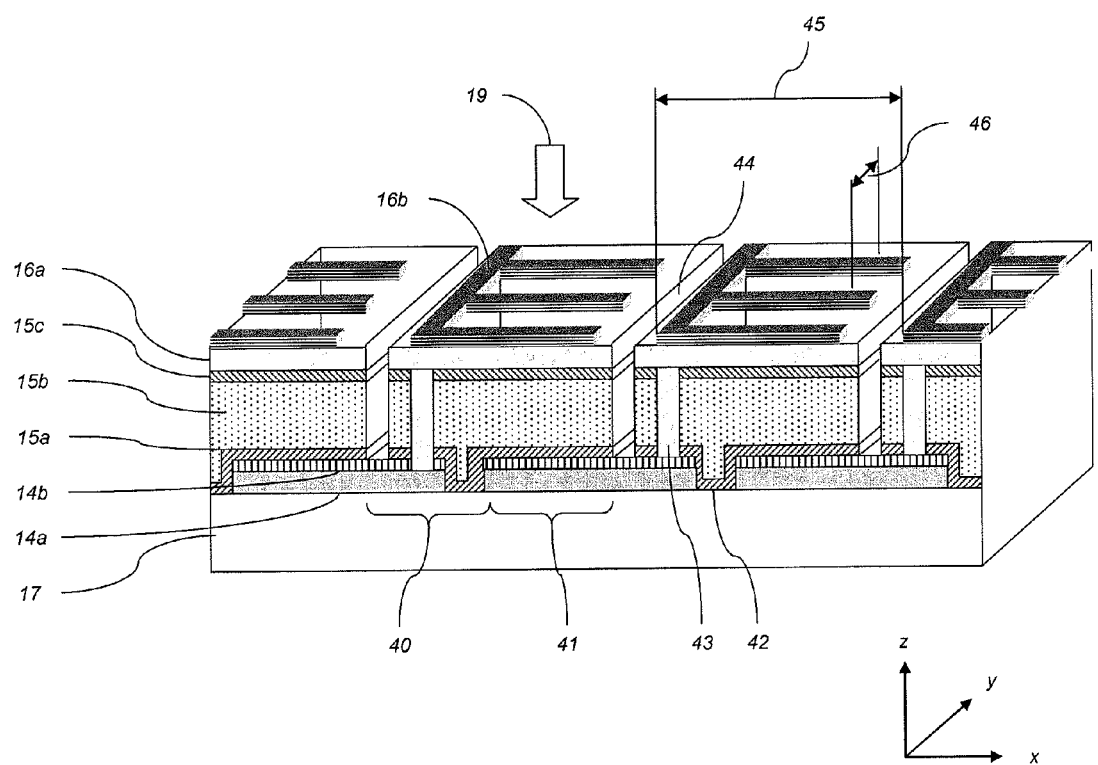
FIG. 13 shows monolithic contacts including finger contacts between adjacent cells in the PV layer.
Figure 14:
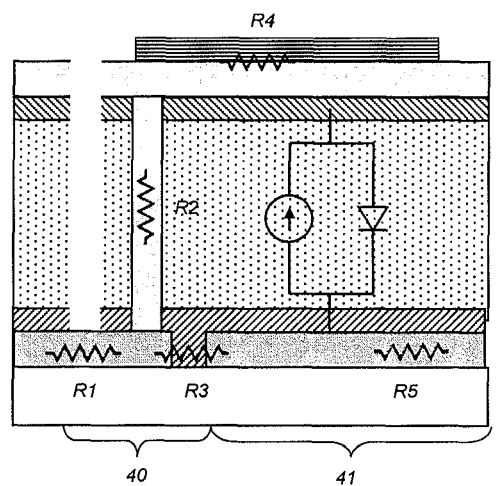
FIGS. 14a-14b show a) the origin of the main parasitic resistances arising from monolithic interconnection of adjacent solar cells in the PV layer; and b) an approximation for the equivalent circuit diagram
Figure 14:
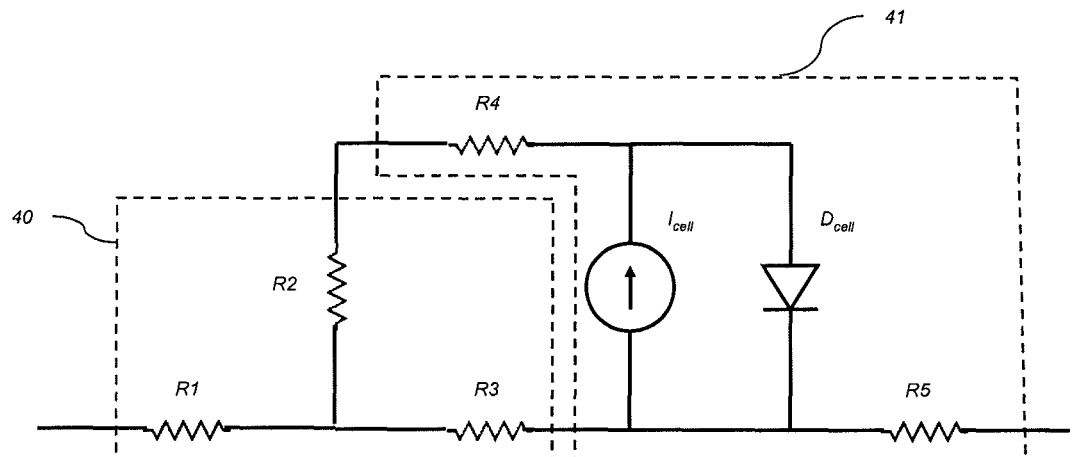
Figure 15:
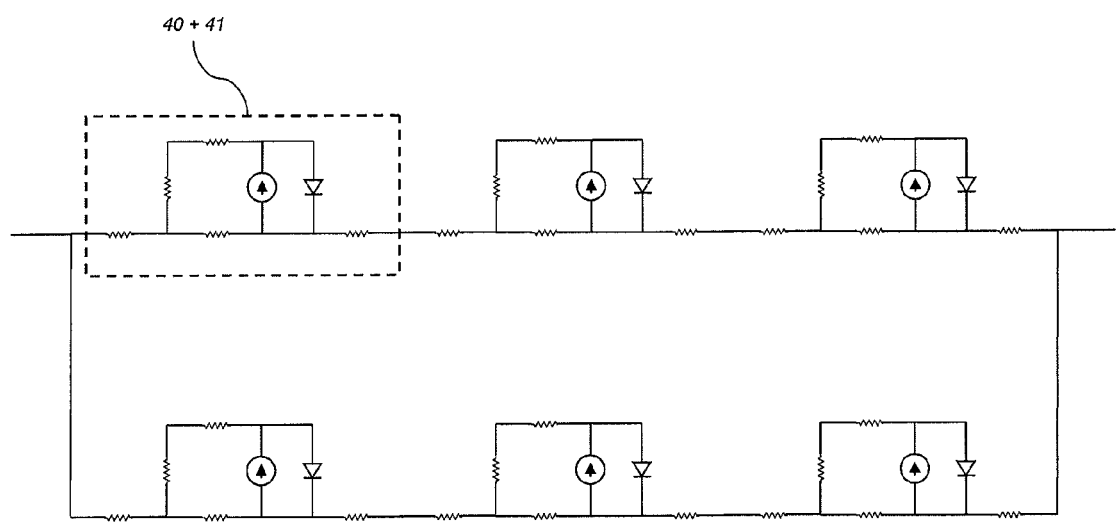
FIG. 15 shows an approximate equivalent circuit for a module comprising six monolithically contacted solar cells in two parallel cascades of three cells.
Figure 16:
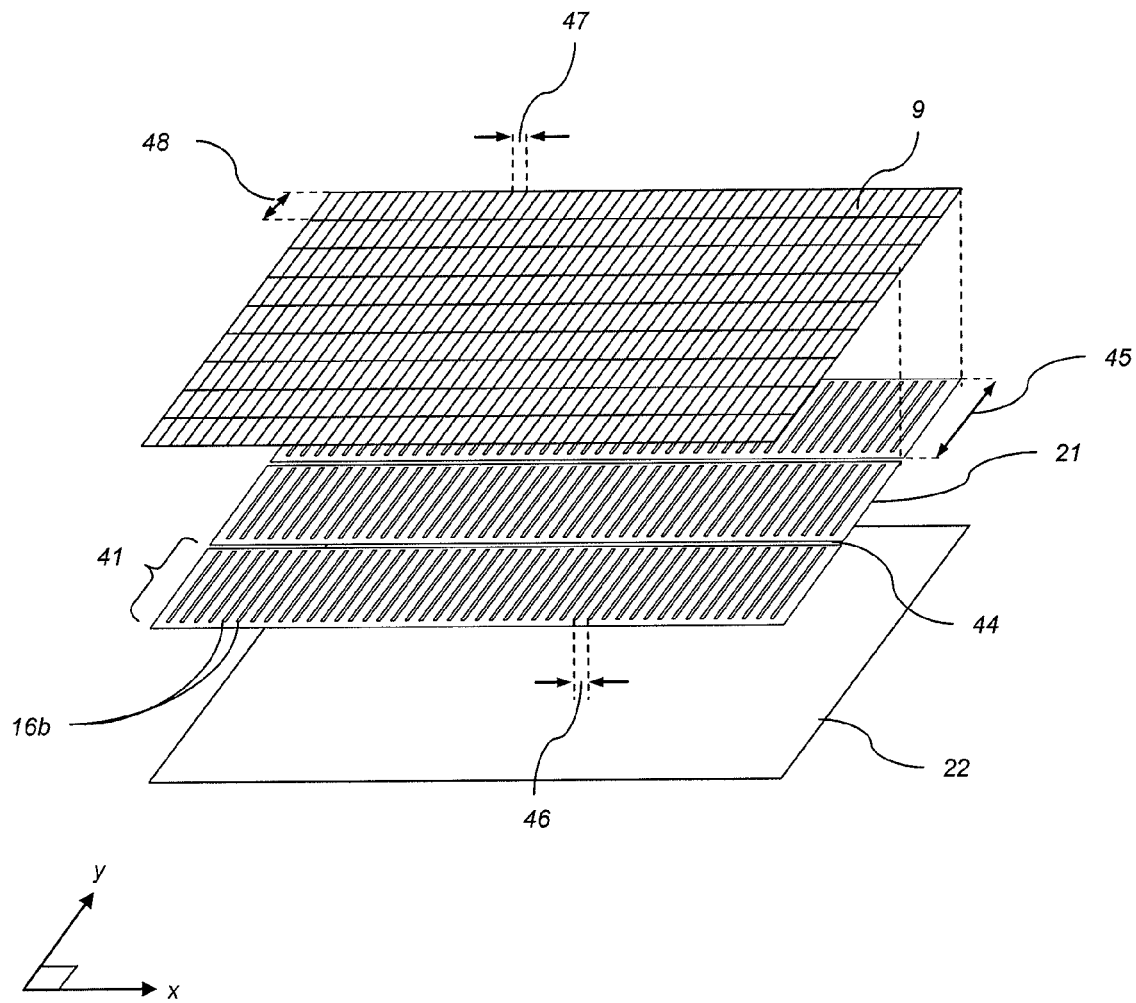
FIG. 16 shows an embodiment of the invention where the monolithic contacts and finger contacts are arranged orthogonally to each other and aligned to the pixel electrode layout.

An ninth embodiment of the invention is the same as the first embodiment except that the PV layer 21 is subdivided into a plurality of smaller PV elements 49 (FIG. 16) by lithography and etching as shown in FIG. 11. Each smaller PV element is electrically connected in series to the adjacent smaller PV elements by monolithic contacts as shown in FIG. 13. The monolithic contact 44 between each smaller PV element is parallel to the x direction. The finger electrodes 16*b* are arranged parallel to the y direction. The smaller PV element pitch 45 is an integer multiple of the pixel pitch 48 in either y direction. The finger electrode pitch 46 is an integer multiple of the pixel pitch 47 in the x direction.

Tenth Embodiment

A tenth embodiment of the invention is the same as the ninth except that the monolithic contacts and finger contacts are arranged parallel to the y-direction and x-direction respectively.

Eleventh Embodiment

An eleventh embodiment of the invention is the same as the ninth embodiment except that the reflective layer 36 between the PV layer and the display comprises a two-dimensional periodic array of conducting nanostructures to simultaneously enhance trapping and absorption of light by the PV element as described, for example, by Pala et al., *Adv. Mater.*, vol 21, 2009, 3504-3509.

Twelfth Embodiment

An twelfth embodiment of the invention is the same as the first embodiment except that there is an additional low refractive index layer 36 as shown in FIG. 9. Fresnel reflections from the interfaces between this layer and other parts of the system cause additional light to be reflected from the display. These reflections may occur before or after the scattering of light in the display element. The greater the refractive index difference between the layer immediately below the PNLC layer, and the layer 36, the greater will be the brightness of the display.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A display device, comprising:
a first layer comprising an optically active display portion;
a second layer comprising a photovoltaic element;
a third layer comprising electronics operatively coupled to the first layer, said electronics configured to drive the optically active display portion, wherein the second layer is arranged between the first and third layers and optically in-line with light incident on the active display portion; and
a reflective layer arranged between the first layer and the second layer, wherein the reflective layer is configured to reflect wavelengths of light that are not in a range of light efficiently used by the photovoltaic element.

2. The device according to claim 1, further comprising:
a common electrode;
a plurality of pixel electrodes, wherein the first layer is arranged between the common electrode and plurality of pixel electrodes; and
a plurality of conducting connectors corresponding to the plurality of pixel electrodes, wherein the conducting connectors electrically couple a respective pixel electrode to the electronics.

3. The device according to claim 1, wherein the first layer comprises at least one of an electrowetting layer or an in-plane electrophoretic layer.

4. The device according to claim 1, wherein the second layer comprises a layer of amorphous silicon and a layer of microcrystalline silicon.

5. The device according to claim 1, wherein the photovoltaic element comprises a cadmium telluride photovoltaic element.

6. The device according to claim 1, further comprising a conductive layer, wherein the reflective layer is combined with the conductive layer.

7. The device according to claim 1, wherein the reflective layer has a refractive index n less than 1.35.

8. The device according to claim 1, further comprising:
a pixel electrode arranged between the first layer and the second layer; and
an insulating layer, wherein the reflective layer and the insulating layer are arranged between the pixel electrode and the first layer.

9. The device according to claim 1, wherein the photovoltaic element is sub-divided into a first plurality of photovoltaic elements cascaded in series with one another.

10. The display device according to claim 1, wherein the display device is a reflective display device.

11. The display device according to claim 1, wherein the optically active display portion comprises a reflective display device, and the electronics are configured to switch the reflective display device between a scattering and non-scattering state.

12. The display device according to claim 1, wherein the display device comprises a polymer-network liquid crystal display (PNLCD) device.

13. The display device according to claim 12, wherein the display device is at least one of a positive-type PNLCD or a reverse-type PNLCD.

14. The display device according to claim 1, wherein the optically active display portion operates in an electrowetting mode.

15. The display device according to claim 1, wherein the photovoltaic element comprises at least one of an amorphous silicon thin-film photovoltaic device, a multiple layer structure, a polymer-based thin-film structure, or a copper indium gallium selenide or sulfide thin-film structure.

16. The device according to claim 1, wherein the second layer comprises a single layer of amorphous silicon.

17. A display device, comprising:
a first layer comprising an optically active display portion;
a second layer comprising a photovoltaic element;
a third layer comprising electronics operatively coupled to the first layer, said electronics configured to drive the optically active display portion, wherein the second layer is arranged between the first and third layers; and
a plurality of finger electrodes arranged on an upper surface of the photovoltaic element, wherein the optically active display device includes a plurality of pixels having a predetermined pixel pitch, and the plurality of finger electrodes have a pitch corresponding to the predetermined pixel pitch.

18. The device according to claim 17, wherein the plurality of finger electrodes comprise a reflective substance.

19. A display device, comprising:
a first layer comprising an optically active display portion;
a second layer comprising a photovoltaic element;
a third layer comprising electronics operatively coupled to the first layer, said electronics configured to drive the optically active display portion, wherein the second layer is arranged between the first and third layers; and
a reflective layer arranged between first layer and the second layer, wherein the optically active display device includes a plurality of pixels, and wherein the reflective layer is non-uniform so as to reflect different colours of light from different sub-pixels of the plurality of pixels in a repeating pattern.

20. A display device, comprising:
a first layer comprising an optically active display portion;
a second layer comprising a photovoltaic element;
a third layer comprising electronics operatively coupled to the first layer, said electronics configured to drive the optically active display portion, wherein the second layer is arranged between the first and third layers and optically in-line with light incident on the active display portion; and a reflective layer arranged between first layer and the second layer, wherein the photovoltaic device is optimized to absorb infra-red light, and the reflecting layer is configured to reflect at least part of the visible spectrum while transmitting infra-red light.

21. A method of making a display device, comprising:

forming driving electronics on a substrate;

forming a photovoltaic element over the driving electronics, including forming a first insulating layer between the photovoltaic element and the driving electronics;

placing an optically active display layer over the photovoltaic element, wherein the photovoltaic layer is optically in-line with light incident on the optically active display layer; and forming a via through the first insulating layer, and forming a pixel electrode through the via and coupled to the driving electronics forming a reflective layer between optically active display layer and the photovoltaic element, wherein the reflective layer is configured to reflect wavelengths of light that are not in a range of light efficiently used by the photovoltaic element.

\* \* \* \* \*